(No Model.) 2 Sheets—Sheet 1.

B. F. LOWTHER.
FLUE WELDING MACHINE.

No. 330,844. Patented Nov. 17, 1885.

WITNESSES
Geo. R. Byington
T. F. Holden

INVENTOR
B. F. Lowther
By his Attorneys
Halleck & Halleck

N. PETERS, Photo-Lithographer, Washington, D. C.

(No Model.)  2 Sheets—Sheet 2.

B. F. LOWTHER.
FLUE WELDING MACHINE.

No. 330,844. Patented Nov. 17, 1885.

WITNESSES
Geo. F. Byington
Thos. F. Holden

INVENTOR
B. F. Lowther
By his Attorney
Hallock & Hauck

UNITED STATES PATENT OFFICE.

BENJAMIN F. LOWTHER, OF GARRETT, INDIANA.

FLUE-WELDING MACHINE.

SPECIFICATION forming part of Letters Patent No. 330,844, dated November 17, 1885.

Application filed May 15, 1885. Serial No. 165,614. (No model.)

*To all whom it may concern:*

Be it known that I, BENJ. F. LOWTHER, a citizen of the United States, residing at Garrett, in the county of DeKalb and State of Indiana, have invented certain new and useful Improvements in Flue-Welding Machines; and I do hereby declare the following to be a full, clear, and exact description of the invention, such as will enable others skilled in the art to which it appertains to make and use the same.

My invention relates to machines for welding iron, and particularly to machines for welding flues.

The object of my invention will more fully appear from the subjoined description, and will be particularly pointed out in the claims.

Figure 3:
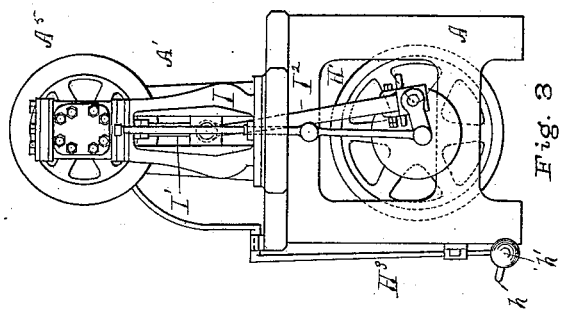
Figure 2:
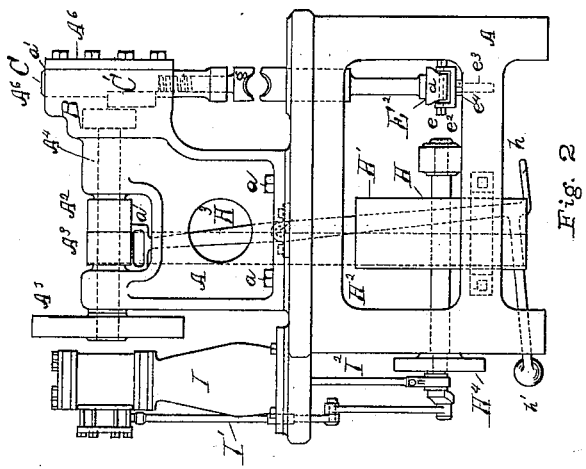
Figure 4:
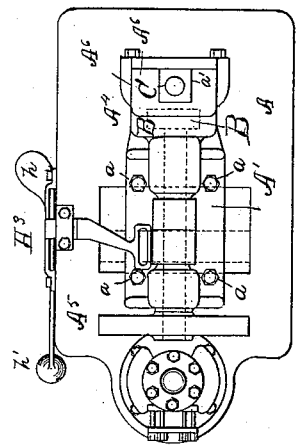
Figure 1:
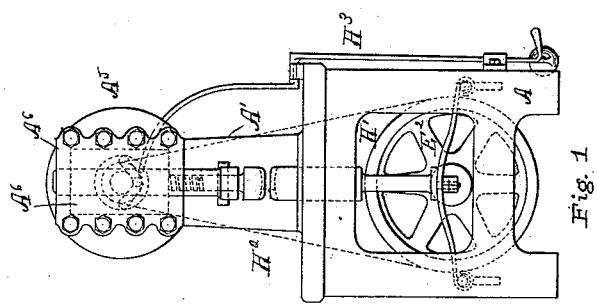
Figure 5:
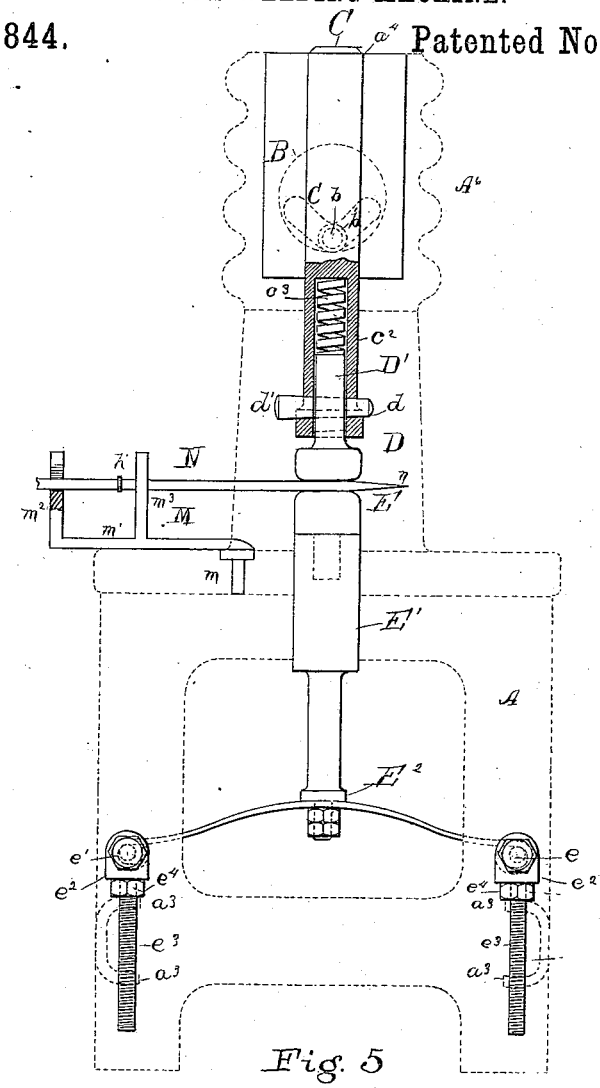
Figure 6:
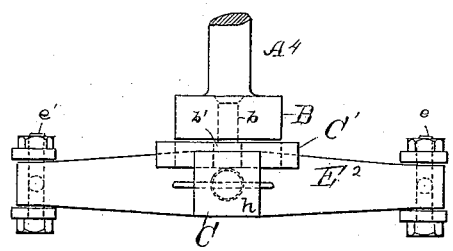

In the accompanying drawings, which show one form of my machine, Figure 1 represents a front elevation; Fig. 2, a side elevation; Fig. 3, a rear elevation; Fig. 4, a top plan; Fig. 5, an elevation having parts broken away and the body of the machine shown in dotted lines; Fig. 6, a top plan of the device shown in full lines in Fig. 5.

The frame A is formed in any suitable manner, and supports the standard A′, which is bolted thereto by bolts $a$. In the upper part of the stand is a U-shaped recess or depression, $a'$, for the fast pulley $A^2$ and the loose pulley $A^3$, mounted on the shaft $A^4$, journaled in the stand and shown in dotted lines, Figs. 2 and 3, and in full lines in Fig. 6, wherein the shaft is broken away back of the cam. Upon the rear end of the shaft is a balance-wheel, $A^5$. Upon the front end is a disk, B, shown in dotted lines in Figs. 2, 4, and 5 and in full lines in Fig. 6. This disk is provided with an eccentrically-placed and case-hardened pin, $b$, having a loose thimble, $b'$, mounted thereon, as indicated in dotted lines in Figs. 5 and 6. These parts are inclosed in the head $A^6$, provided with the vertical opening $a^4$ for the hammer C, which is attached to a motion-plate, C′, provided with a heart-cam, $c$, (shown in dotted lines, Figs. 1 and 5,) for the thimble, which acts in the walls thereof, to operate the hammer C. Upon the lower end of this hammer is placed the upper die, D, having in its shank D′ a vertical slot, $d$, for the key $d'$, which holds it in place in the recess $c^2$ in the head of the hammer. This slot $d$ is larger than the key, so that the die will have a slight vertical motion independently of the hammer-head. In the recess $c^2$, between the top of the shank D′ and the top of the recess, is interposed a coiled spring, $c^3$, which relieves the cam and other parts of the machine from the shock of the blow of the hammer upon the tube. Below the die D is the bottom die, E, and its holder, E′, supported by an elliptical spring, $E^2$, having at its ends the fulcrum-bolts $e$ and $e'$, supported by the yoke $e^2$, having the screw-threaded stem $e^3$, which passes into openings $a^3$ in the side rail of the frame, and provided with the adjusting-nuts $e^4$ and $e^5$, by which the height of the springs is regulated, and consequently adjusting the distance between the dies. The object of this spring $E^2$ is to provide means for automatically adjusting the lower die to the inequalities of the flue to be welded, and at the same time present a medium which, while yielding sufficiently for the purpose designed, will resist enough to permit of the parts of the tube being welded.

Power can be applied to pulley $A^2$ and $A^3$, either from shafting in the shop where the machine is used, or the driving mechanism may be part of the machine.

One manner of thus constructing the machine is shown in the drawings, and will not be described. Journaled to the frame A in any suitable manner is a shaft, H, having thereon a fast pulley, H′, connected with the pulleys $A^2$ and $A^3$ by belt $H^2$. (Shown in dotted lines in Figs. 1 and 2.) This belt is provided with a belt-shifter, $H^3$, fulcrumed in the frame and having at its lower end the pedal $h$ and counter-balance $h'$, which draws the belt upon the loose pulley as soon as the foot is removed from the pedal $h$. Power is applied to this shaft by means of the vertical engine I, having the valve-gear I′ and piston $I^2$, attached eccentrically to the disk $H^4$ on the end of the shaft. If desired, an extra pulley may be attached to this shaft to drive other small machinery in the shop.

Upon the top of frame A is attached a mandrel frame or support, M, consisting of a shank, $m$, which is inserted in an opening in the table, and a bed, $m'$, having slotted uprights $m^2$ and $m^3$, in which the mandrel N is inserted. This mandrel is pointed at the end $n$, which projects between the dies, and is provided with the collar $h'$, which regulates the distance that the mandrel can be moved longitudinally.

It is obvious that the mandrel can be shifted vertically to meet the wants of the lower die when it is adjusted; also, that the dies can be readily removed from their seats and dies of different sizes and for different purposes—for example, swaging—can be substituted therefor.

The operation of the machine is as follows: Power is imparted by the engine to shaft H, which communicates its motion to pulleys $A^2$ and $A^3$ by means of belt $H^2$. When upon loose pulley $A^3$, the hammer remains at rest, and when upon fast pulley $A^2$ the shaft $A^4$ is revolved and causes, by means of the disk B and its thimble $b'$, the motion-plate and its hammer and die to reciprocate in the box $A^6$ and strike the tube resting upon the lower die. The tube is passed over the mandrel in such a position that the parts to be welded will be immediately between the dies, the upper striking rapidly upon the parts to be welded, which parts are turned as occasion demands.

What I claim as new is—

1. In a welding-machine, the combination of the vertically-moving hammer having an opening in its lower end, a die having a shank projecting into said opening, a cushion interposed between it and the hammer, a locking device for the die and hammer, the lower die for the tube to rest upon, and means, substantially as described, for moving said hammer and die, for the purpose set forth.

2. In a welding-machine, the combination of the vertically-moving hammer having a die with cushion interposed between it and the hammer, the lower die supported by a partially-yielding medium, and means, substantially as described, for operating the movable hammer and die, for the purpose set forth.

3. In a welding-machine, the combination of a die having a shank provided with a vertical slot, a hammer having a recess for the shank, and a key of less size than said slot for holding the die in place, and a cushion interposed between the die and hammer, substantially as described.

4. In a welding-machine, the combination of the lower die having the die-holder and an elliptical spring supporting said die-holder, substantially as described.

5. In a welding-machine, the combination of the lower die and the elliptical spring having adjusting devices, substantially as described.

6. In a flue-welding machine, the combination of a frame, the fast and loose pulleys above the frame and connected with a power-shaft by a belt, a vertical belt-shifter pivoted to the frame and having its upper end connected with the belt and its lower end having a fixed short arm or pedal and a fixed long arm or counter-balance, substantially as described.

In testimony whereof I affix my signature in presence of two witnesses.

BENJAMIN F. LOWTHER.

Witnesses:
GEO. R. BYINGTON,
M. F. HALLECK.